Sept. 21, 1943.  H. S. JANDUS  2,329,722
BRAKE LEVER
Filed Jan. 22, 1942
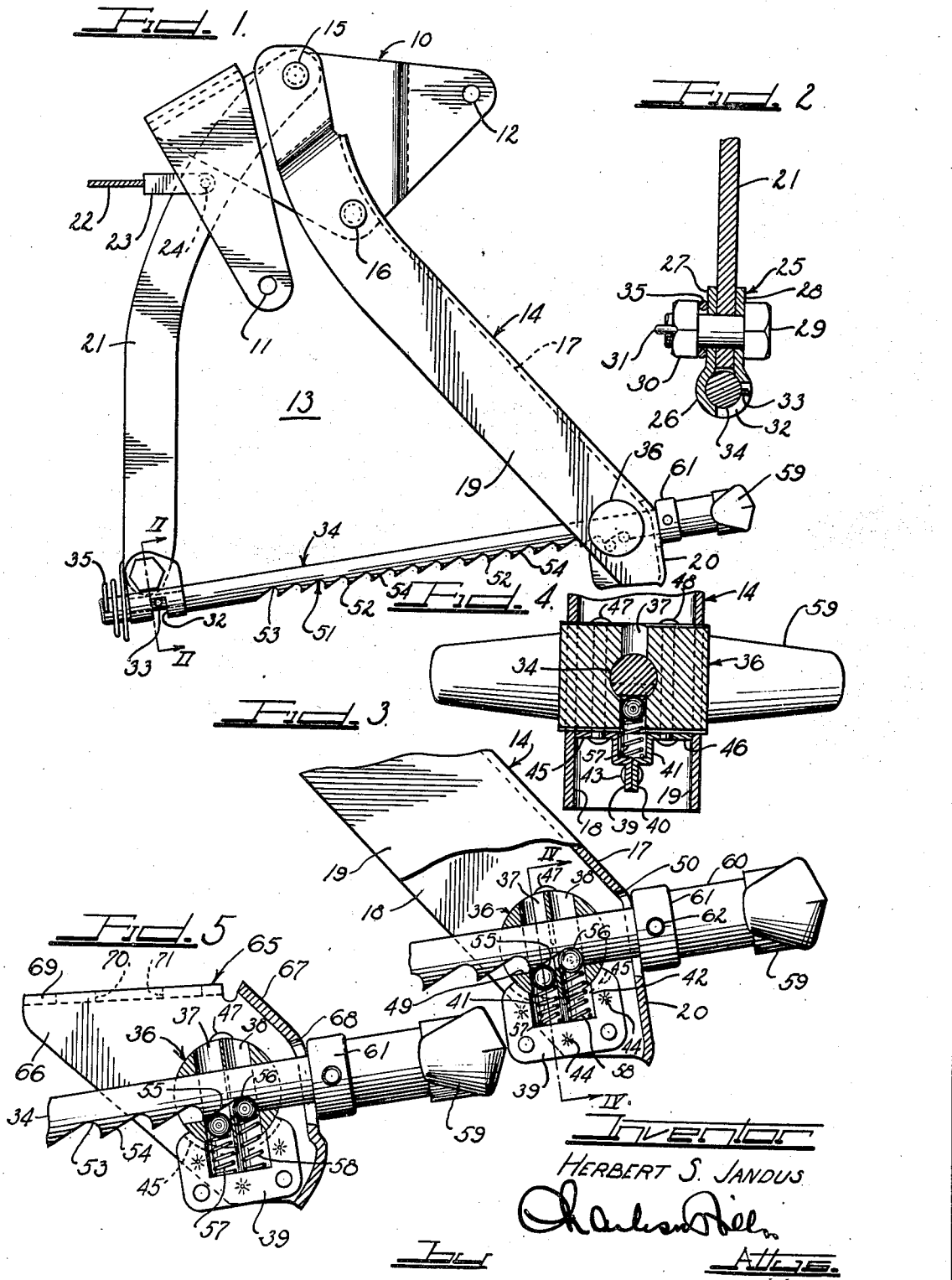
Inventor
HERBERT S. JANDUS Patented Sept. 21, 1943

2,329,722

UNITED STATES PATENT OFFICE 2,329,722

BRAKE LEVER

Herbert S. Jandus, Detroit, Mich., assignor to Houdaille-Hershey Corporation, Detroit, Mich., a corporation of Michigan Application January 22, 1942, Serial No. 427,709

6 Claims. (Cl. 74—541)

This application is a continuation-in-part of my copending application for patent entitled: "Brake lever," filed June 6, 1940, U. S. Serial No. 339,069.

This invention relates to a novel brake lever construction and more particularly to an improved brake-operating device whereby the brakes of an automotive vehicle are set and released by an actuating member movable substantially in an endwise direction and which is released from an adjusted held position by rotative movement.

An important object of this invention is the provision of an actuating mechanism in which a push-pull member operates an actuating member.

Another object of the invention is to provide a lever construction with an actuating member movable in a substantial endwise direction for operating an associated mechanism and which is released from an adjusted held position by rotative movement.

A further object of this invention is the provision of a combination straight-pull and swinging type of brake lever construction wherein the actuating member is held in adjusted position by a plunger mechanism assembly.

A further object of this invention is to provide a combination straight-pull and swinging type of brake lever construction having an actuating member normally arranged to be maintained by spring pressure in an adjusted held position to which it is moved and being further arranged for limited rotative movement to release it from its adjusted position.

A still further object of this invention is the provision of an actuating mechanism having a push-pull actuating member with a row of ratchet teeth therealong which coact with a plurality of spring-pressed balls positioned on one side of the push-pull member whereby the balls alternately engage each tooth on the push-pull member as the latter is moved in a longitudinal direction for effecting a plurality of locking adjusted positions of the push-pull member in excess of the number of ratchet teeth thereon.

Another and still further object of the present invention is to provide a brake-operating means which is simple in construction, durable and efficient in use, and which may be readily applied in place.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawing, in which:

Figure 1 is a side elevational view of a brake lever mechanism constructed in accordance with the principles of the present invention;

Figure 2 is an enlarged fragmentary vertical cross-sectional view, with parts in elevation, taken substantially in the plane indicated by the line II—II of Figure 1;

Figure 3 is an enlarged fragmentary view of the lower right hand corner portion of the device illustrated in Figure 1 and with a portion broken away and shown in vertical cross section to illustrate details of construction of a double ball ratchet mechanism;

Figure 4 is a fragmentary vertical cross-sectional view, with parts in elevation, taken substantially in the plane indicated by the line IV—IV of Figure 3; and Figure 5 is a view similar to Figure 3 and illustrating a modified form of support construction for the push-pull actuating member of the device of this invention.

The brake lever construction herein illustrated is a straight-pull (push-pull) type of lever arrangement adapted to the swinging type of lever. It is to be understood, however, that the actuating lever arrangement of this invention may be adapted for use with any mechanism to be actuated in a swinging or endwise direction. The brake lever construction illustrated herein is similar to the so-called dash-type in that it is adapted to be pivoted behind the instrument board of an automotive vehicle, with the actuating grip portion projecting below and beyond the instrument board in a position for instant use by the vehicle operator.

As particularly illustrated in Figure 1, the brake lever construction of this invention is shown as including a mounting plate or bracket 10 of flat metal stamped and shaped to proper size and form for connection to a vehicle (not shown) by means of suitably provided apertures 11 and 12. With the supporting bracket 10 attached to the dash or body portion of the vehicle, the brake lever assembly 13 is suitably supported therefrom for convenient operation by the vehicle operator.

As best shown in Figures 1, 3 and 4, a U-shaped supporting member 14 is connected to in depending relation from the mounting bracket 10 by means of rivets 15 and 16 or the like. The supporting member 14 has a web 17 which connects spaced parallel side walls 18 and 19. The upper ends of the side walls are offset inwardly toward each other in closely spaced relation for a purpose to be more fully described hereinafter. The lower end of the supporting member has its web portion 17 angularly offset to provide an abutment portion 20.

A flat lever 21 is suitably apertured at its upper end to pivotally hang from the rivet 15 between the closely spaced inturned portions of the side walls of the supporting member 14. The braking mechanism of the vehicle (not shown) may be suitably connected to the swinging lever 21 by means of an actuating rod or cable 22 and a clevis which straddles the flat lever and is connected thereto by means of a bolt or rivet 24. Swinging movement of the flat lever 21 about its pivot 15 actuates a braking mechanism through endwise movement of the brake rod or cable 22.

As best shown in Figure 2, a U-shaped bracket 25 has a partially circular portion 26 at its lower end and spaced upstanding legs 27 and 28 which straddle and are connected to the lower end of the lever 21 by means of a bolt 29. A nut 30 is threaded on the end of the bolt and maintained in position thereon by means of a cotter pin 31.

It will be noted in Figures 1 and 2 that an elongated slot 32 is provided in the partially circular portion 26 to receive therein a pin 33 extending radially from a ratchet rod 34. A coil spring 35 has one end embedded in the ratchet rod 34 or otherwise suitably connected thereto with its other end embracing the shank of the bolt 29 between the upstanding leg 27 of the bracket 25 and the nut 30 of the bolt. As best seen in Figure 2, when the nut 30 is threaded against the end coil of the spring 35 the latter is locked in position around the bolt shank.

The radially extending pin 33 is normally maintained at one end of the slot 32 by means of the coil spring 35. In this manner, the ratchet rod 34 may be rotated around its longitudinal axis until the pin 33 engages the other end of the slot 32.

The parts described for connecting the lever 21 and ratchet rod 34 permits relative angular movement and limited rotative movement therebetween. The coil spring 35 exerts pressure on the ratchet rod to normally maintain it in a position in which the slot and pin coact as illustrated in Figures 1 and 2.

As best shown in Figures 3 and 4, the lower end of the supporting member 14 is suitably apertured to receive through the side walls 18 and 19 thereof a trunnion member 36. The trunnion 36 is circular in cross-section in order to rock in the side walls which act as bearing supports. A pair of through openings 37 and 38 are provided in spaced relation in the trunnion member for a purpose to be more apparent hereinafter.

A pair of stamped members 39 and 40 are shaped to provide spring sockets 41 and 42. These two members are assembled together at their marginal flange portions by the rivets 43 or, if desired, by being spot welded together as at 44. The member 39 has a laterally extending flange 45 which is curved as shown in Figure 3 to seat against the trunnion member 36. Likewise, the member 40 has a laterally extending flange 46 which is also curved to seat against the trunnion member. Through rivets or bolts 47 and 48 clamp the lateral flanges 45 and 46 to the trunnion member in such a position that the spring sockets 41 and 42 are in alignment with the through openings 37 and 38.

It will be noted in Figure 4 that the lateral flanges 45 and 46 abut the inner surfaces of the side walls 18 and 19 to permit the trunnion member 36 to rotate but restrict it against axial movement relative to the supporting member 14.

The ratchet rod 34 extends through an opening 49 in the trunnion member 36 which opening is normal to the spaced through openings 37 and 38. The ratchet rod also extends through an elongated opening 50 provided in the web 17 of the supporting member.

A single row of socket slots 51 defining ratchet teeth 52 therebetween is provided in a straight-line path along an edge of the ratchet rod intermediate its end portions. Each slot has a semi-circular portion 53 and a cam surface 54 sloping outwardly away therefrom and toward the end of the ratchet rod in connection with the lever 21. This row of socket slots is so positioned by the coil spring 35 and the coaction of the slot 32 and pin 33 as to be normally in alignment with a pair of balls 55 and 56. These balls are seated respectively in chambers defined by the through openings 37 and 38 in the trunnion member and maintained in engagement with the ratchet rod by coil springs 57 and 58 seated respectively in the spring sockets 41 and 42.

An actuating handle 59 has a tubular portion 60 which terminates in an abutment collar 61 embracing an end of the ratchet rod 34 and connected thereto by any suitable means such as a rivet 62, pin, bolt or the like. If desired, the handle 59 may be formed of a suitably colored plastic material either molded directly to the ratchet rod, or connected thereto in a manner similar to that illustrated and described previously. The abutment collar 61 serves as a stop when in engagement with the web 17 for endwise movement of the ratchet rod 34 in one direction.

With the parts of the lever assembly 13 in the positions as illustrated in Figure 1, or in a fully brake-released position, the operator merely grasps the handle 59 and pulls it toward him or in a direction to the right. During movement of the ratchet rod 34 in this direction, the spring pressed balls 55 and 56 slide along the slanting cam surfaces 54 of the ratchet teeth defined by the slots 51. Tension of the brake-actuating mechanism, as exerted through the actuating rod or cable 22, tends to pull the lever 21 to the left. This tendency is overcome by engagement of either one of the spring-pressed balls against a rounded surface 53 of one of the slots 51 thereby holding the ratchet rod in an adjusted position. It will be noted in Figure 3 that only one of the spring pressed balls can at one time seat against the rounded surface of an adjacent ratchet slot. The through openings 37 and 38 in the trunnion member 36 are spaced closely together in order that the spring pressed balls 55 and 56 will alternately engage each of the ratchet slots as the ratchet rod is operated in an endwise direction. This coaction of parts effects twice the number of adjusted positions for the ratchet rod as would be possible if but one spring pressed ball was provided.

To release the ratchet rod, the operator merely rotates the handle 59 in a counter-clockwise direction against pressure of the coil spring 35 and to the limit afforded by coaction of the pin 33 and the slot 32 thereby aligning the spring pressed balls 55 and 56 with a smooth surface of the ratchet rod adjacent the toothed path. The parts in this position allow the ratchet rod 34 to be freely reciprocated in either endwise direction.

It is to be noted that the lever 21 is swung about its pivot 15 by substantially an endwise push-pull action exerted on the handle 59 of the ratchet rod by the operator. As the ratchet rod moves from its fully brake-released position, Figure 1, to its fully brake-actuated position, not shown, the substantial horizontal position of the ratchet rod is changed in an angularly vertical direction which necessitates providing the trunnion 36 for pivotal connection to the side walls 18 and 19 of the supporting member 14. The vertical displacement of the ratchet rod as the trunnion member pivots necessitates the provision of the elongated slot 50 in the web 17 of the supporting member.

If desired, the ratchet rod 34 may be a tubular member with the teeth 52 thereon formed by indenting its periphery to shape the recesses or slots 51.

Figure 5 illustrates a modified form of a supporting member which may be substituted for the supporting member 14 previously described herein. In those installations in which space will not permit the use of a supporting member such as 14 illustrated in Figure 1, a supporting member such as 65 may be provided for attachment to the instrument board or other part of the vehicle in spaced relation to that part of the vehicle to which the lever 21 is pivotally connected. All of the parts illustrated in Figure 5 are the same as those illustrated in Figure 3 with the exception of the supporting member.

In this modified form of construction, the supporting member 65 is of U-shaped construction similar to the lower end of the supporting member 14 and has spaced parallel side walls only one of which is shown as at 66. The side walls are connected by a generally curved web 67 having an intermediate portion thereof apertured as at 68 for receiving the ratchet rod 34 therethrough. The intermediate apertured portion is engaged by the abutment collar 61 of the handle 59 for re-restricting endwise movement of the ratchet rod in one direction. Each of the side walls of the supporting member 65 have their upper portions turned laterally outward to provide mounting portions for the supporting member. As shown in Figure 5, the side wall 66 is turned laterally outward to provide the mounting flange 69 having apertures 70 and 71 therethrough by which the flange is bolted or riveted to a supporting portion of the vehicle. The side walls are also apertured to receive the trunnion 36 therethrough and which is maintained against axial or endwise movement by cooperation with the curved lateral flanges 45 and 46 of the members 39 and 40 shaped to provide the spring sockets.

While the ratchet assemblies illustrated and described herein provide for spring pressed balls alternately engaging a slot in the ratchet rod, it is to be understood that any suitable plunger arrangement may be substituted therefore, it being necessary only that more than one plunger be provided to coact with the ratchet slots whereby the ratchet rod is held in twice the number of adjusted positions as is possible when only one spring pressed ball or plunger arrangement is used.

The brake lever construction of the present invention provides a swinging type of lever which is actuated by a substantially straight-pull type of ratchet rod, the latter being held in twice the number of adjusted positions by cooperation of spring-pressed balls or plungers and released for endwise movement by partial rotation. The provision of a plurality of spring-pressed ratchet members for cooperation with but a single row of ratchet teeth provides more holding positions for the ratchet rods than would be possible if but one spring pressed ratchet member was provided.

While particular embodiments only of this invention have been illustrated, it will, of course, be understood that the invention should not be limited thereto, since many modifications may be made, and it is therefore contemplated by the appended claims to cover all such modifications as fall within the true spirit and scope of the present invention.

I claim as my invention:

1. An actuating mechanism comprising a member arranged for movement in substantially an endwise direction and for limited movement in a rotative direction about its own axis, socket slots arranged in a straight-line path longitudinally along said member, and a supporting and ratchet mechanism for cooperation with said member, said mechanism including a support member, a trunnion pivoted on said support member and having a plurality of openings therethrough, one of said openings receiving said slotted member therethrough, the others of said openings being normal to said one opening, and spring pressed plungers in said other openings on one side of said slotted member normally engaging said line of slots for holding the member in an adjusted position to which it is moved in an endwise direction, said plungers inoperatively engaging smooth areas on said member adjacent said line of slots for releasing the member from its adjusted position when it is rotated.

2. A ratchet mechanism for cooperation with a ratchet rod having a line of socket slots arranged in a straight-line path longitudinally therealong, comprising a trunnion having a through opening for receiving the ratchet rod therethrough, chambers in said trunnion intersecting said through opening, a member carried by said trunnion having sockets therein in alignment with said chambers, spring means in said sockets, and plungers in said chambers urged by said spring means into engagement with the socket slots in said ratchet rod for holding the latter in an adjusted position.

3. A ratchet mechanism for cooperation with a ratchet rod having a line of socket slots arranged in a straight-line path longitudinally therealong, comprising a support member, a trunnion pivoted on said support member and having a through opening for receiving the ratchet rod therethrough, spaced chambers in said trunnion intersecting said through opening, a member having sockets therein in alignment with said chambers and flanges seated on the periphery of said trunnion and connected thereto, a spring in each of said sockets, and a ball in each of said chambers urged by the spring therein into engagement with a socket slot in said ratchet rod for holding the latter in an adjusted position.

4. A ratchet mechanism for cooperation with a ratchet rod having a line of socket slots arranged in a straight line path longitudinally therealong, comprising a support member having spaced apertured side walls, a trunnion member journalled in the apertures of said side walls, said trunnion member having a plurality of openings therethrough, one of said openings intersecting the others and receiving the ratchet rod therethrough, a member having connected portions defining sockets and flanges seated on the periphery of said trunnion member and connected thereto for aligning the sockets with said other openings in the trunnion member, said flanges slidingly engaging the side walls of the support member for restricting endwise movement of the trunnion member relative to the support member, a spring in each of said sockets, and a ball in each of said other openings in the trunnion and normally in alignment with the row of socket slots, said balls being urged by said springs into alternate engagement with each of the socket slots as the ratchet rod is moved through said trunnion member whereby the ratchet rod is held in a plurality of adjusted positions for each slot thereon.

5. A support member for a ratchet mechanism including a trunnion member having bearing portions, comprising spaced side walls having apertures therethrough for receiving the bearing portions of the trunnion member, a connecting web between said side walls, and flanges on said side walls for connecting said support member to a base.

6. A support member for a ratchet mechanism including a trunnion member having bearing portions, comprising spaced side walls having aligned apertures for receiving the bearing portions of the trunnion member, a longitudinally curved web connecting the side walls together, and an outwardly extending apertured flange on each side wall adjacent the web for connecting said support member to a base.

HERBERT S. JANDUS.